(12) United States Patent
Aikoh

(10) Patent No.: US 8,919,962 B2
(45) Date of Patent: Dec. 30, 2014

(54) OPTICAL APPARATUS AND PROJECTION APPARATUS

(75) Inventor: Yoshihisa Aikoh, Kanagawa (JP)

(73) Assignee: Sony Corporation, Tokyo (JP)

( * ) Notice: Subject to any disclaimer, the term of this patent is extended or adjusted under 35 U.S.C. 154(b) by 166 days.

(21) Appl. No.: 13/615,915

(22) Filed: Sep. 14, 2012

(65) Prior Publication Data

US 2013/0077053 A1 Mar. 28, 2013

(30) Foreign Application Priority Data

Sep. 22, 2011 (JP) ................................ 2011-207014

(51) Int. Cl.
*G03B 21/14* (2006.01)
*G03B 21/20* (2006.01)
*G02B 27/28* (2006.01)

(52) U.S. Cl.
CPC .......... *G03B 21/2073* (2013.01); *G02B 27/283* (2013.01)
USPC .................. 353/20; 353/30; 353/84; 353/94; 353/99; 353/119; 348/751; 348/752

(58) Field of Classification Search
USPC .......... 353/20, 30, 31, 37, 52, 81, 84, 94, 99, 353/119; 349/5, 7–9, 96, 104, 106; 348/336, 337, 338, 339, 383, 739, 744, 348/751, 752; 359/483.01, 485.01, 485.05, 359/485.06, 487.04
See application file for complete search history.

(56) References Cited

U.S. PATENT DOCUMENTS

| | | | | |
|---|---|---|---|---|
| 6,053,615 A | * | 4/2000 | Peterson et al. ................. | 353/20 |
| 6,056,407 A | * | 5/2000 | Iinuma et al. .................. | 353/119 |
| 6,115,084 A | * | 9/2000 | Miyashita et al. ............. | 348/792 |
| 2003/0231287 A1 | * | 12/2003 | Maki et al. ..................... | 353/119 |
| 2004/0109329 A1 | * | 6/2004 | Kato ............................. | 362/555 |
| 2004/0165152 A1 | * | 8/2004 | Ito et al. .......................... | 353/30 |
| 2005/0007556 A1 | * | 1/2005 | Yanagisawa .................... | 353/31 |

FOREIGN PATENT DOCUMENTS

JP 2009-20240 1/2009

* cited by examiner

*Primary Examiner* — Sultan Chowdhury
(74) *Attorney, Agent, or Firm* — Frommer Lawrence & Haug LLP; William S. Frommer; Ellen Marcie Emas

(57) ABSTRACT

Provided is an optical apparatus including a polarization separation element for separating an incident light beam into a first polarization component and a second polarization component and outputting the first polarization component and the second polarization component, a polarization conversion unit including a waveplate for converting one of the first polarization component and the second polarization component into the other polarization component, the waveplate being held to a holding metal plate, and a housing for holding the polarization separation element and the polarization conversion unit.

17 Claims, 10 Drawing Sheets

OPTICAL APPARATUS AND PROJECTION APPARATUS

BACKGROUND

The present technology relates to an optical apparatus, and a projection apparatus.

In a projector (a projection apparatus) that is one image display device, a discharge lamp is widely used as a light source and a transmission-type liquid crystal element or a DMD (Digital Micromirror Device) is widely used as an image modulation element. Also, a device and an optical component have been enhanced. Further, in recent years, a projection-type image display device using a higher resolution reflection-type liquid crystal panel (a reflection-type optical modulation element) has also been put into practical use.

Brightness of an image to be displayed are important elements in gaining an advantage in the projector market. When a light amount of a light source increases to brighten an image to be displayed by a projector, temperatures of parts on an optical path rise. The rise in temperature of the parts on the optical path causes an error in an optical positional relationship due to a difference in linear expansion coefficient between constituent parts and causes degradation of image quality of a projected image such as a change in focus position of the projected image or a change in projection position.

For this reason, as a heat solution for a projector, for example, a waveplate adhered to a PS conversion element (an optical device) for aligning a polarization direction of light with a predetermined polarization direction may he formed of a quartz member usable in a higher temperature environment.

[Patent Literature 1] Japanese Patent Laid-Open Publication No. 2009-20240

SUMMARY

However, a demand to increase a light amount of a light source has become stronger and stronger, and an advanced heat solution for a PS conversion element has become necessary. Further, even when the heat solution is performed, high-accuracy positioning of the PS conversion element is necessary in order to maintain image quality.

The present technology has been made in view of the circumstances described above, and it is desirable to provide an optical apparatus and a projection apparatus capable of achieving both a heat solution and positioning accuracy.

According to an embodiment of the present disclosure, an optical apparatus includes a polarization separation element, a polarization conversion unit, and a housing. The polarization separation element separates an incident light beam into a first polarization component and a second polarization component and outputs the first polarization component and the second polarization component. The polarization conversion unit includes a waveplate for converting one of the first polarization component and the second polarization component into the other polarization component, and the waveplate is held to a holding metal plate. The housing holds the polarization separation element and the polarization conversion unit.

Further, according to an embodiment of the present disclosure, a projection apparatus includes a light source, an optical apparatus, a separation optical component, a plurality of optical modulation elements, a synthesis optical component, and a projection unit. The optical apparatus converts a polarization component of an incident light beam from the light source. The separation optical component separates an output light from the light source according to wavelength bands. The plurality of optical modulation elements optically modulate the incident light separated according to the wavelength bands. The synthesis optical component synthesizes output lights from the plurality of optical modulation elements and outputs the resulting output light. The projection unit projects and outputs the output light from the synthesis optical component.

Further, this optical apparatus includes a polarization separation element, a polarization conversion unit, and a housing. The polarization separation element separates an incident light beam into the first polarization component and the second polarization component and outputs the components. The polarization conversion unit includes a waveplate for converting one of the first polarization component and the second polarization component into the other polarization component, and the waveplate is held to a holding metal plate. The housing holds the polarization separation element and the polarization conversion unit.

According to the optical apparatus and the projection apparatus described above, both the heat solution and the positioning accuracy are achieved.

DETAILED DESCRIPTION OF THE EMBODIMENTS

Figure 1:
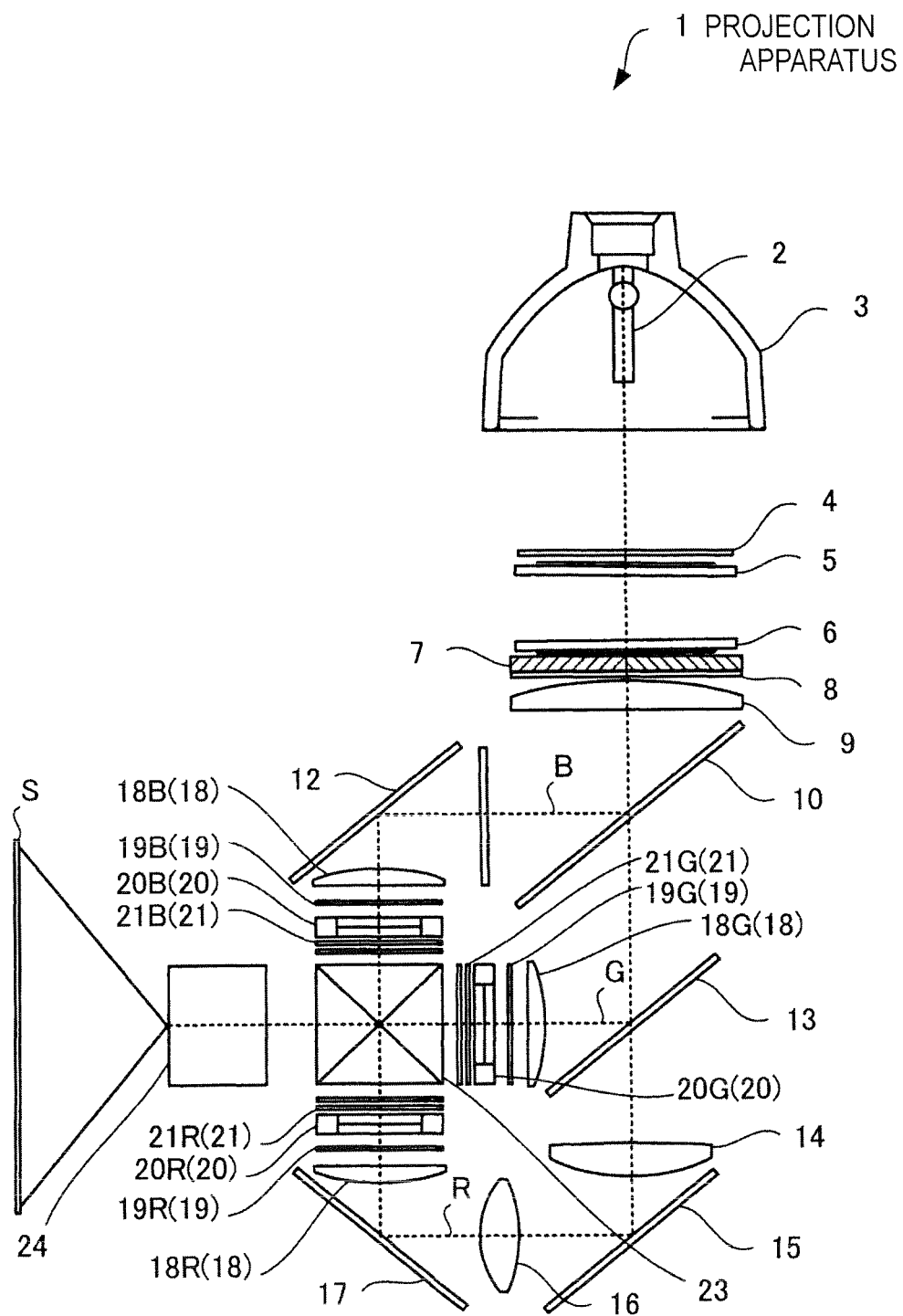
FIG. 1 is a view showing a configuration of an optical component of a projection apparatus of a first embodiment.

Hereinafter, embodiments will be described with reference to the drawings.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

(First Embodiment)

Figure 2:
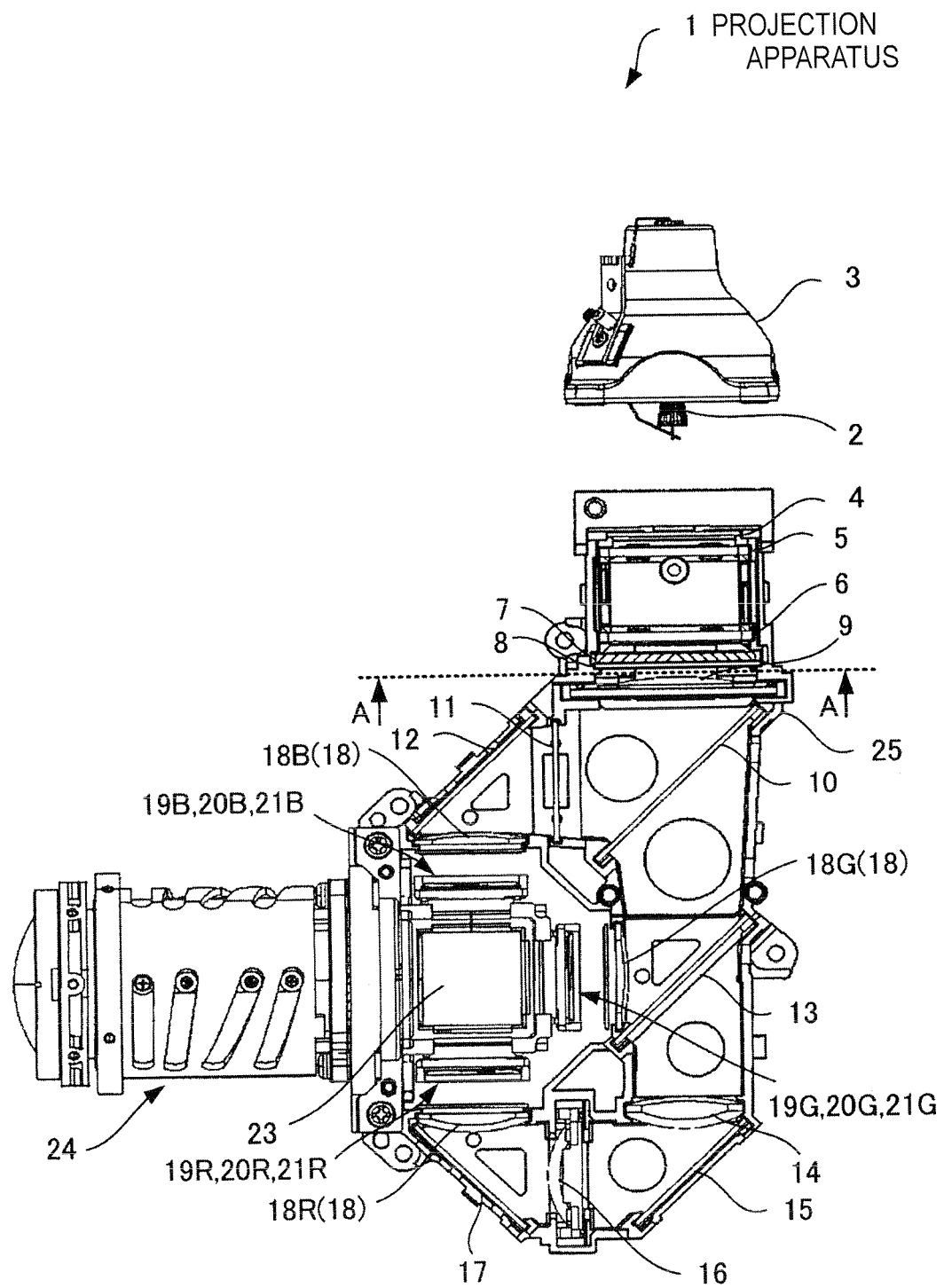
FIG. 2 is a plan view showing an overview of the projection apparatus of the first embodiment.

First, a projection apparatus of a first embodiment will be described with reference to FIGS. 1 and 2. FIG. 1 is a view showing a configuration of an optical component of the projection apparatus of the first embodiment. FIG. 2 is a plan view showing an overview of the projection apparatus of the first embodiment.

The projection apparatus 1 includes a light source 2, an illumination optical component, a separation optical component, optical modulation elements 20, a synthesis optical component, a projection optical component 24, and a unit base 25.

The light source 2 is, for example, an HID (High Intensity Discharge) lamp such as an ultra-high pressure mercury lamp or a metal halide lamp, and outputs white light. The light source 2 is arranged in a focus position of the reflector 3, and the reflector 3 reflects the white light output from the light source 2 to generate substantially parallel light.

The illumination optical component includes a UV (Ultra-Violet) cut filter 4, a fly-eye lens (a first fly-eye lens) 5, a fly-eye lens (a second fly-eye lens) 6, a polarization separation element 7, a quartz waveplate unit (a polarization modulation element) 8, and a condenser lens 9.

The UV cut filter 4 is provided on the front of the light source 2, and blocks passage of ultraviolet rays output from the light source 2. The fly-eye lens 5 and the fly-eye lens 6 receive substantially parallel lights reflected by the reflector 3 and output the lights to the polarization separation element 7 The fly-eye lens 5 and the fly-eye lens 6 uniformize illuminance of lights incident on the optical modulation element 20.

The polarization separation element 7 separates the incident light beam into a first polarization component and a second polarization component. For example, the polarization separation element 7 receives light containing s-polarized light and p-polarized light, and outputs the p-polarized light to a first area and the s-polarized light to a second area.

The quartz waveplate unit 8 aligns a polarization axis of the output light from the polarization separation element 7 in a predetermined direction. For example, the quartz waveplate unit 8 modulates the p-polarized light incident on the first area with the s-polarized light and aligns a polarization axis of the p-polarized light with the s-polarized light incident on the second area.

The condenser lens 9 receives and condenses the output light of the quartz waveplate unit 8. A white light output from the condenser lens 9 is incident on the separation optical component.

The separation optical component separates the incident light from the condenser lens 9 into R, G and B (red, green and blue) lights. The separation optical component includes a dichroic mirror 10, a dichroic mirror 13, a reflection mirror 12, a reflection mirror 15, a reflection mirror 17, a relay lens 14, a relay lens 16, and condenser lenses 18 (18R, 18G, and 18B).

The dichroic mirror 10 and the dichroic mirror 13 selectively transmit or reflect the respective R, G and B lights according to wavelength bands of the lights. The dichroic mirror 10 transmits the light G in a green wavelength band and the light R in a red wavelength band, and reflects the light B in a blue wavelength band. The dichroic mirror 13 transmits the light R in the red wavelength band and reflects the light G in the green wavelength band. Accordingly, the white light is color-separated into three R, G and B colors.

The reflection mirror 12 includes a total reflection mirror, and reflects the light B in the blue wavelength band separated by the dichroic mirror 10 and guides the light to the optical modulation element 20B. The reflection mirror 15 and the reflection mirror 17 include a total reflection mirror, reflect the light R in the red wavelength band separated by the dichroic mirror 13, and guide the light to the optical modulation element 20R.

The relay lens 14 and the relay lens 16 perform correction of an optical path length for the light R in the red wavelength band. The condenser lenses 18 converge the light G in the green wavelength band, the light R in the red wavelength band, and the light B in the blue wavelength band.

The light G in the green wavelength band, the light R in the red wavelength band, and the light B in the blue wavelength band output from the separation optical component are incident on the optical modulation elements 20 (20R, 20G, and 20B), respectively.

There are incident-side polarization plates 19 (19R, 19G, and 19B) on the front (the light source side) of the optical modulation elements 20 (20R, 20G, and 20B). The polarization plates 19 (19R, 19G, and 19B) align polarization components of the light G in the green wavelength band, the light R in the red wavelength band, and the light B in the blue wavelength band output from the separation optical component. The optical modulation elements 20 (20R, 20G, and 20B) spatially modulate the light R in the red wavelength band, the light G in the green, wavelength band, and the light B in the blue wavelength band, respectively. Output-side polarization plates 21 (21R, 21G, and 21B) transmit predetermined polarization components in the spatially modulated lights.

The synthesis optical component includes a color synthesis prism 23. The color synthesis prism 23 is configured to transmit the light G in the green wavelength band and reflect the light R in the red wavelength band and the light B in the blue wavelength band toward the projection optical component 24. The color synthesis prism 23 is formed, for example, by bonding a plurality of glass prisms (four right-angled isosceles prisms having substantially the same shape), and two interference filters having a predetermined optical characteristic are formed on a bonding surface of each glass prism. The first interference filter reflects the light B in the blue wavelength band and transmits the light R in the red wavelength band and the light G in the green wavelength band. The second interference filter reflects the light R in the red wavelength band and transmits the light G in the green wavelength band and the light B in the blue wavelength band. Accordingly, the respective R, G and B lights modulated by the optical modulation elements 20 (20R, 20G, and 20B) are synthesized by the color synthesis prism 23 and incident on the projection optical component 24.

The projection optical component 24 expands the output light from the color synthesis prism 23 to a predetermined magnification and projects an image to a screen S.

Further, the illumination optical component including the polarization separation element 7 and the quartz waveplate unit 8 are held to a unit base (an optical reference housing) 25 with predetermined accuracy. The unit base 25 holds the illumination optical component, as well as the separation optical component, the optical modulation elements 20, the synthesis optical component, and the projection optical component 24, and enables each constituent part to be optically positioned with high accuracy.

Figure 3:
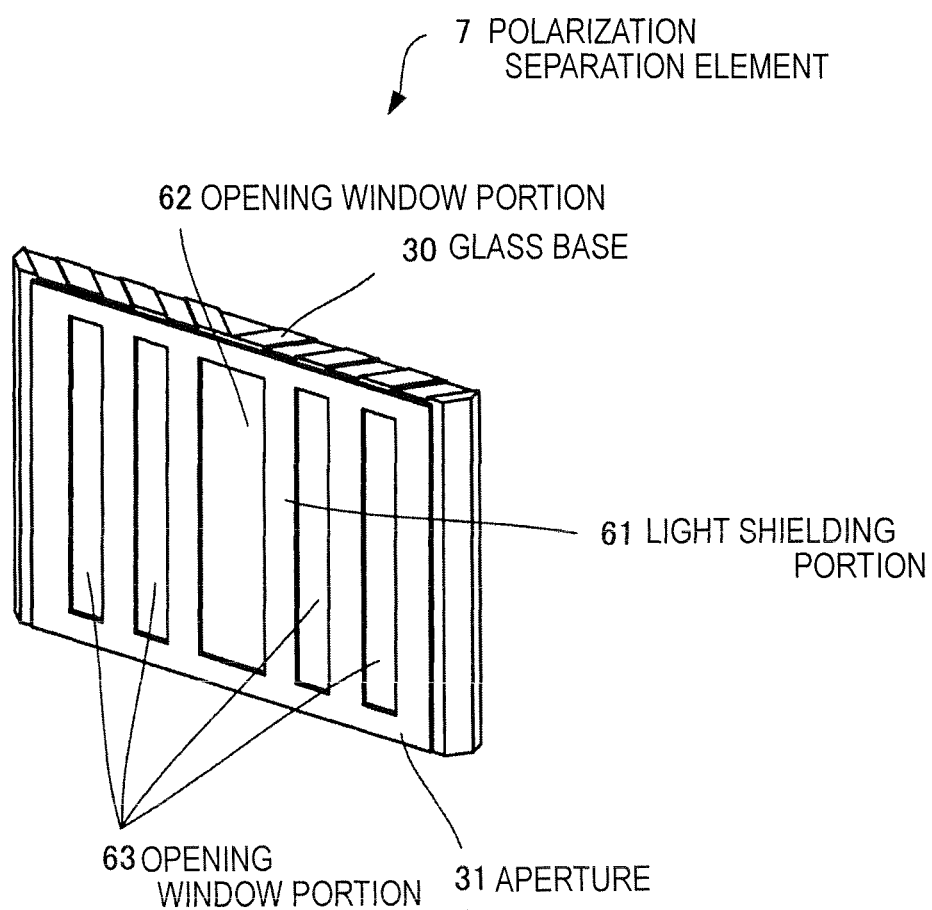
FIG. 3 is a perspective view showing an overview of a polarization separation element of the first embodiment.

Next, the polarization separation element of the first embodiment will be described with reference to FIG. 3. FIG. 3 is a perspective view showing an overview of the polarization separation element of the first embodiment.

The polarization separation element 7 separates an incident light beam containing the s-polarized light (a first polarization component) and the p-polarized light (a second polarization component) into the s-polarized light and the p-polarized light. The polarization separation element 7 includes an aperture (a light shielding plate) 31 and a flat plate-shaped glass base 30. The aperture 31 is a metal plate such as stainless, and is adhered or stuck to the glass base 30 in a predetermined position. The aperture 31 includes a light shielding portion 61 for shielding the incident light, and opening in window portions 62 and 63 for passing the incident light, and limits a range of incidence of a light beam on the glass base 30. The aperture 31 includes the opening window portion 62 formed at its center, the two opening window portions 63 formed on the left of the opening window portion 62, and the two opening window portions 63 formed on the right of the opening window portion 62. The opening window portions 62 and 63 have a rectangular shape of the same size in a longitudinal direction, and the opening window portion 62 has a rectangular shape of about twice the size of the opening window portion 63 in a width direction.

The glass base 30 includes a plurality of optical thin films (polarization separation films and reflective films) obliquely arranged to form a predetermined angle (e.g., about 45°) with respect to the incident light beam, and has a symmetrical structure in a width direction. The glass base 30 outputs a polarized light transmitted through the optical thin films among light beams passing through the opening window portions 62 and 63, from regions corresponding to the opening window portions 62 and 63 on the side of an output surface of the glass base 30. Further, the glass base 30 outputs a polarized light reflected by the optical thin films among the light beams passing through the opening window portions 62 and 63, from a region corresponding to the light shielding portion 61 on the side of the output surface of the glass base 30. Further, the polarized light transmitted through the optical thin films is modulated to have the same polarization as the polarized light, which has been reflected by the optical thin film, by a quartz waveplate 32 (see FIG. 4) that will be described later.

Figure 4:
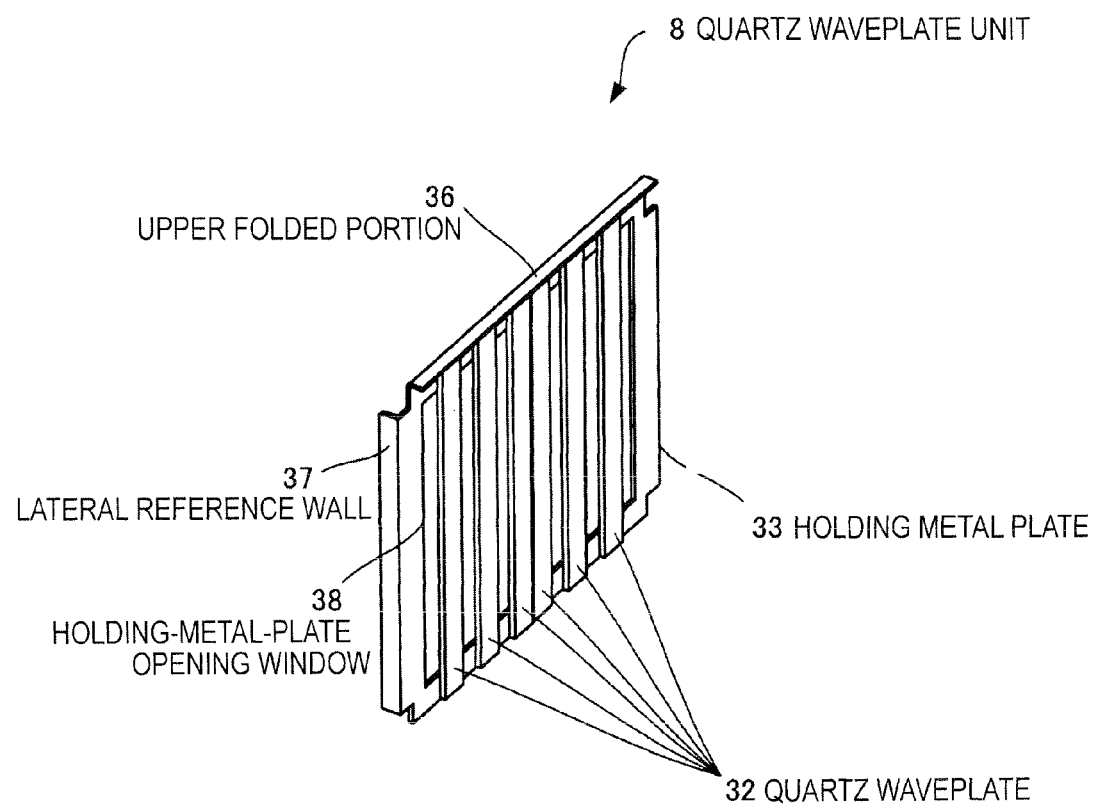
FIG. 4 is a perspective view showing an overview of a quartz waveplate unit of the first embodiment.
Figure 5:
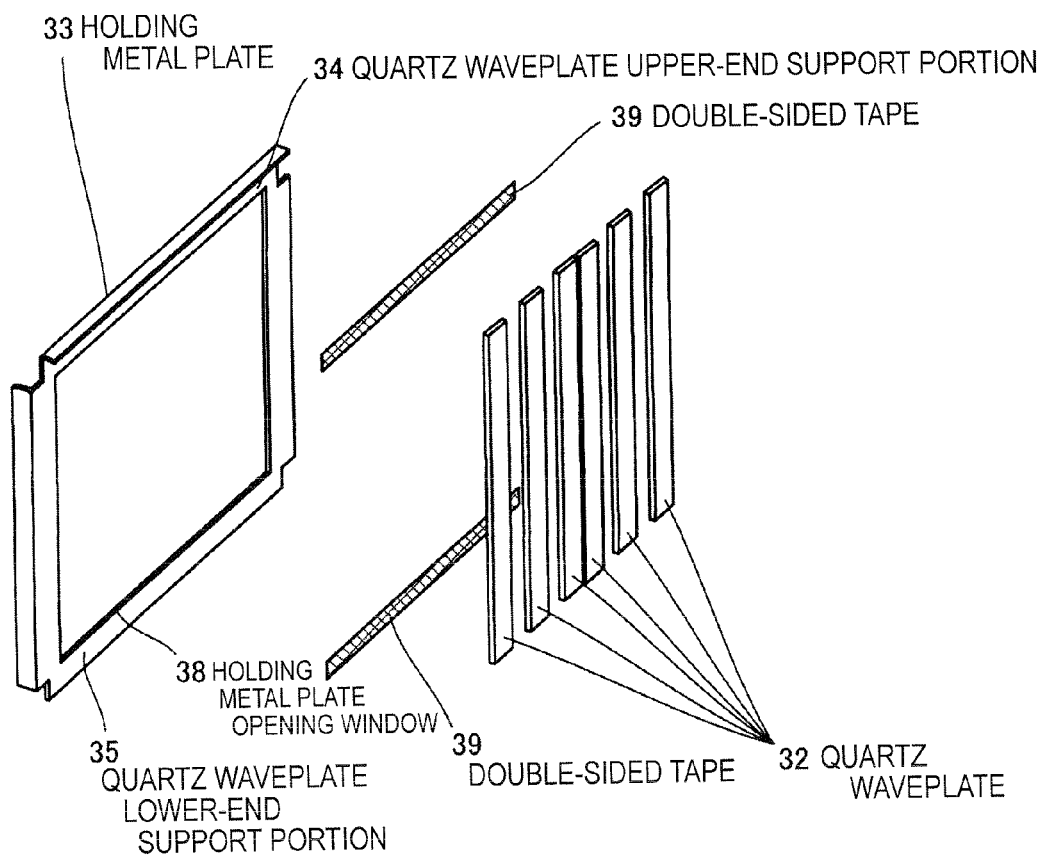
FIG. 5 is an exploded perspective view of the quartz waveplate unit of the first embodiment.

Next, the quartz waveplate unit of the first embodiment will be described with reference to FIGS. 4 and 5. FIG. 4 is a perspective view showing an overview of the quartz waveplate unit of the first embodiment. FIG. 5 is an exploded perspective view of the quartz waveplate unit of the first embodiment.

The quartz waveplate unit 8 includes a holding metal plate 33 and a plurality of quartz waveplates 32. The holding metal plate 33 is a frame-shaped metal plate that forms a holding-metal-plate opening window 38, and includes a lateral reference wall 37 formed on one side thereof and an upper folded portion 36 formed on an upper side thereof.

An incident surface of the holding metal plate 33 surface-contacts an output surface of the polarization separation element 7. The lateral reference wall 37 stands facing the incident surface and contacts one end surface of the polarization separation element 7. Accordingly, the lateral reference wall 37 serves as a reference to define a positional relationship between the holding metal plate 33 and the polarization separation element 7. Further, the lateral reference wall 37 serves as a reference to define a positional relationship between the unit base 25 and the holding metal plate 33 by contacting the unit base 25.

The upper folded portion 36 is in the upper portion of the holding metal plate 33 and is folded toward the output surface. The upper folded portion 36 improves strength of the holding metal plate 33 through bending. The holding metal plate 33 is capable of performing heat dissipation through cooling fins, and when the holding metal plate 33 is an aluminum metal plate, the holding metal plate 33 has excellent heat dissipation.

In the holding metal plate 33, the quartz waveplate 32 is stuck to a quartz waveplate upper-end support portion 34 including two opposite frame-shaped sides that form the holding metal plate opening window 38, and a quartz waveplate lower-end support portion 35 in a predetermined position (a position in which an output light from a region corresponding to the opening window portions 62 and 63 on the side of an output surface of the glass base 30 is incident) through a double-sided tape 39.

The quartz waveplate 32 is a strip-shaped waveplate formed of quartz. The quartz waveplate 32 is usable under a higher temperature environment, unlike a waveplate formed of a resin (e.g., polycarbonate).

Accordingly, the quartz waveplate unit 8 may align a polarization axis of the output light from the polarization separation element 7 in a predetermined direction. For example, the quartz waveplate unit 8 may modulate the p-polarized light incident on regions in which the quartz waveplates 32 are arranged with the s-polarized light and align the s-polarized light and the p-polarized light incident on the other regions.

Further, the holding metal plate 33 holds the quartz waveplates 32 with a double-sided tape 39. A stress caused by a difference in linear expansion between the quartz waveplates 32 and the holding metal plate 33 can be absorbed by deformation of the double-sided tape 39. Further, an excessive difference in linear expansion between the quartz waveplates 32 and the holding metal plate 33 can be suppressed by the heat dissipation of the holding metal plate 33. Further, reworking when the quartz waveplates 32 are replaced is facilitated by holding the quartz waveplates 32 with the holding metal plate 33. Further, since the quartz waveplates 32 are held to the holding metal plate 33 through the double-sided tape 39, reworking when the quartz waveplates 32 are replaced is facilitated. Improved reworking contributes to reduction of an assembly cost and improvement of a yield of the quartz waveplates 32.

Further, in the case of a configuration in which quartz waveplates are stuck to a glass base of the related art, heat dissipation may be degraded and the quartz waveplates may be damaged due to a stress caused by a difference in linear expansion between the glass base and the quartz waveplates. However, the polarization separation element 7 and the quartz waveplate unit 8 enable use in a higher temperature range due to high reliability of a holding structure of the quartz waveplates 32.

Figure 6:
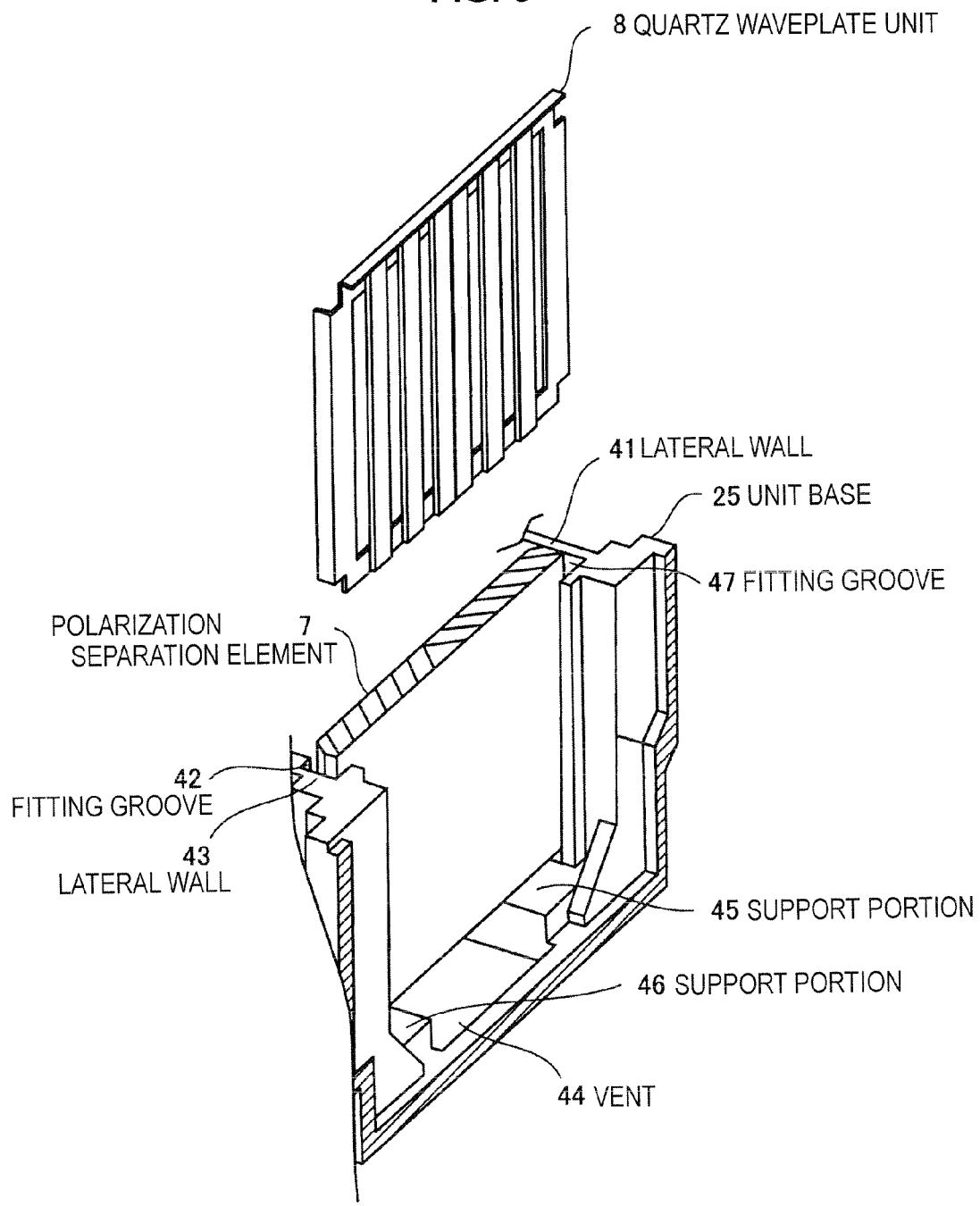
FIG. 6 is a partial cross-sectional view taken along a line A-A of a unit base showing assembly positions of the polarization separation element and the quartz waveplate unit of the first embodiment.
Figure 7:
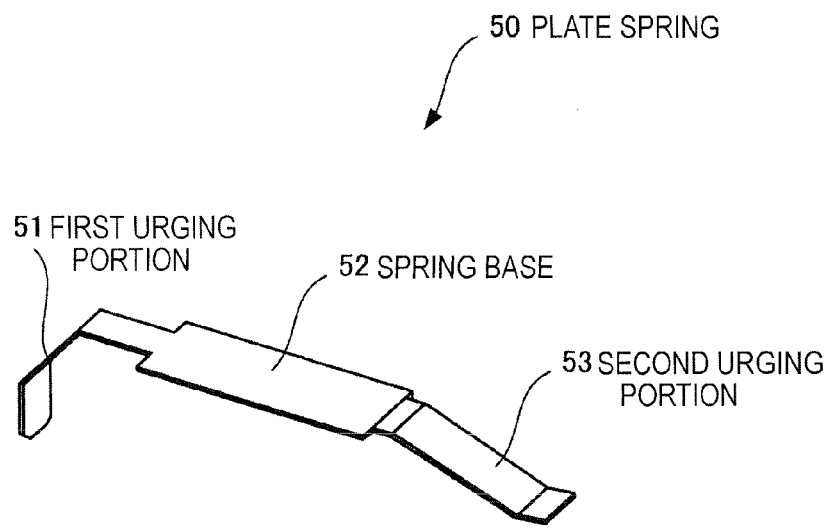
FIG. 7 is a perspective view showing an overview of a plate spring of the first embodiment.
Figure 8:
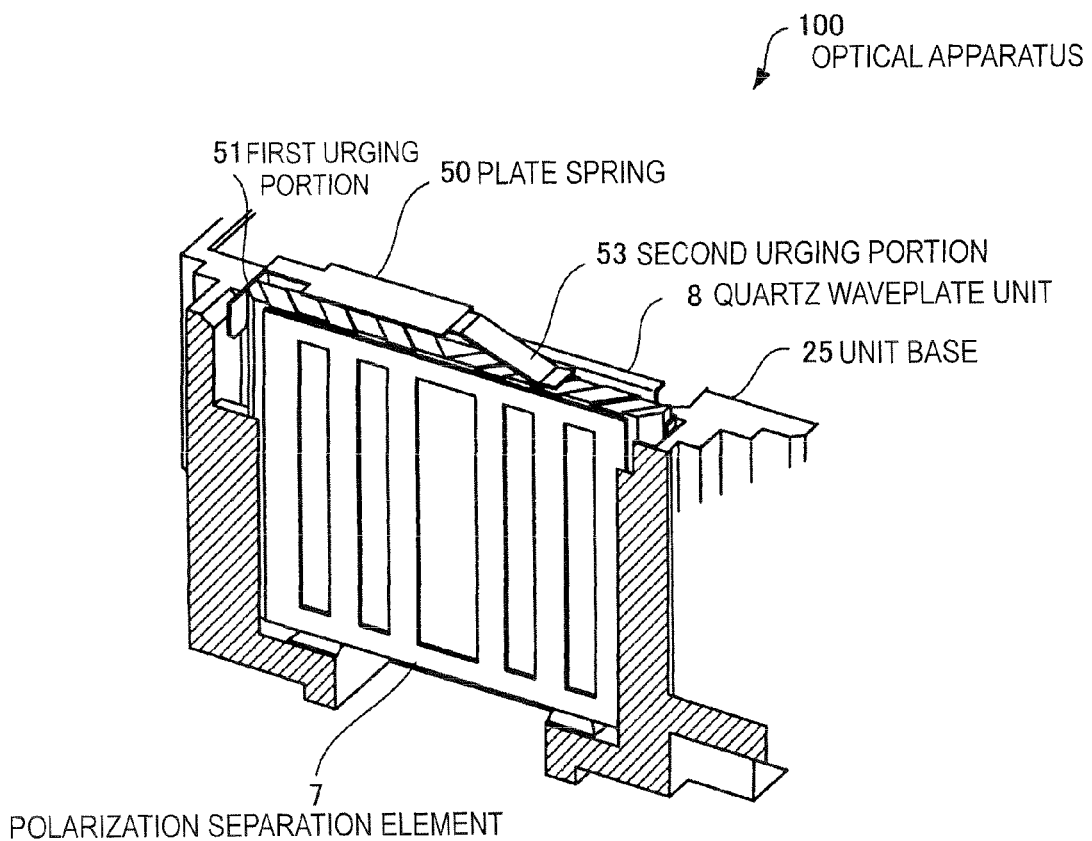
FIG. 8 is a partial cross-sectional view taken along the line A-A of the unit base showing a state in which the polarization separation element and the quartz waveplate unit of the first embodiment are held.
Figure 9:
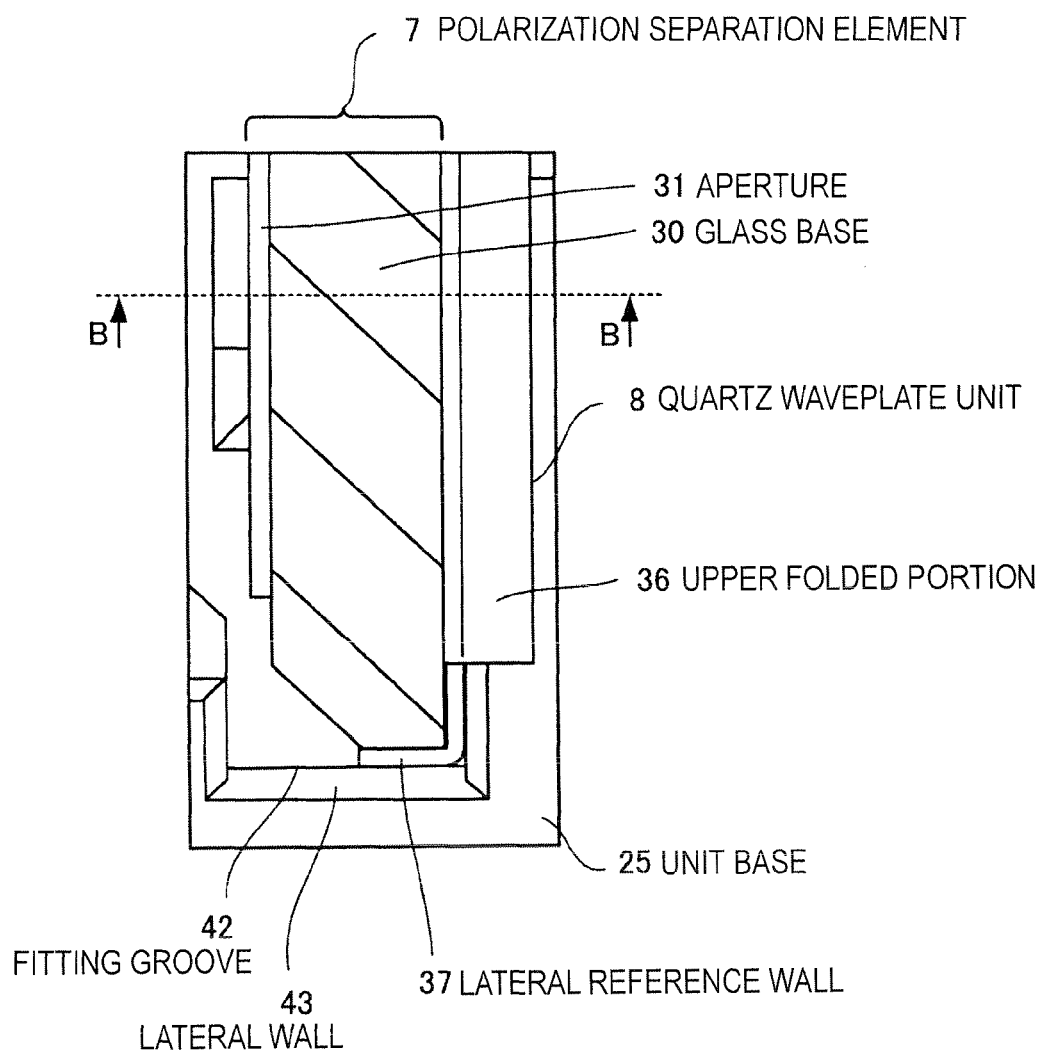
FIG. 9 is a partial plan view of the unit base showing a state in which the polarization separation element and the quartz waveplate unit of the first embodiment are held.

Next, a state in which the polarization separation element 7 and the quartz waveplate unit 8 are held to the unit base 25 in the first embodiment will be described with reference to FIGS. 6 to 9. FIG. 6 is a partial cross-sectional view taken along a line A-A of the unit base showing assembly positions of the polarization separation element and the quartz waveplate unit of the first embodiment. FIG. 7 is a perspective view showing an overview of a plate spring of the first embodiment. FIG. 8 is a partial cross-sectional view taken along the line A-A of the unit base showing a state in which the polarization separation element and the quartz waveplate unit of the first embodiment are held. FIG. 9 is a partial plan view of the unit base showing a state in which the polarization separation element and the quartz waveplate unit of the first embodiment are held.

The unit base 25 holds the polarization separation element 7 and the quartz waveplate unit 8 with optical position accuracy. The unit base 25 includes fitting grooves 42 and 47 for fitting both sides of the polarization separation element 7 and both sides of the quartz waveplate unit 8 with a predetermined gap. The unit base 25 includes support portions 45 and 46 that the polarization separation element 7 and the quartz waveplate unit 8, which are fit into the fitting grooves 42 and 47, are placed on and supported by. The unit base 25 includes a vent 44 formed between the support portion 45 and the support portion 46.

The fitting grooves 42 and 47 and the support portions 45 and 46 form a housing portion for housing the polarization separation element 7 and the quartz waveplate unit 8. The polarization separation element 7 and the quartz waveplate unit 8 are housed in the housing portion so that the polarization separation element 7 is placed on an incidence side for the light beam from the light source 2 and the quartz waveplate unit 8 is placed on an output side. A movement of the polarization separation element 7 and the quartz waveplate unit 8 in a horizontal direction (a direction in which the quartz waveplates 32 are arranged) is regulated by opposite lateral walls 41 and 43. The polarization separation element 7 is housed in the housing portion so that the surface having the aperture 31 is placed on the incidence side for the light beam from the light source 2. The quartz waveplate unit 8 is housed in the housing portion so that the surface on which the quartz waveplates 32 are stuck is placed on the output side.

The vent 44 is a passage in which an air flow from a cooling fan, which is not shown, flows along the polarization separation element 7 and the quartz waveplate unit 8.

The optical apparatus 100 includes a plate spring 50 for urging the polarization separation element 7 housed in the housing portion. The plate spring 50 includes a spring base 52, a first urging portion 51, and a second urging portion 53. The spring base 52 is supported by a support portion, which is not shown. The first urging portion 51 is a plate spring extending from one side of the spring base 52.

The first urging portion 51 contacts corners formed by the upper end surface of the polarization separation element 7 (an end surface facing the open side of the housing portion) and a side surface facing the lateral wall 41 to urge the polarization separation element 7 obliquely downward. That is, the first urging portion 51 urges the upper end surface of the polarization separation element 7 downward (in a housing direction) and urges a side surface facing the lateral wall 41 of the polarization separation element 7 in a horizontal direction (a direction of the lateral wall 43).

The second urging portion 53 contacts the upper end surface of the polarization separation element 7 to urge the polarization separation element 7 downward. That is, the second urging portion 53 urges the upper end surface of the polarization separation element 7 downward (in the housing direction).

As the first urging portion 51 urges the polarization separation element 7 toward the lateral wall 43, the polarization separation element 7 is brought into contact with the lateral reference wall 37 and the lateral reference wall 37 is brought into contact with the lateral wall 43 (see FIG. 9). Urging to bring the lateral reference wall 37 into contact with the lateral wall 43 via the polarization separation element 7 prevents displacement of the polarization separation element 7 and the quartz waveplate unit 8 in a horizontal direction. Further, urging to bring the lateral reference wall 37 into contact with the lateral wall 43 via the polarization separation element 7 prevents rotation around one lateral side of the polarization separation element 7 and the quartz waveplate unit 8 (separation of a leading edge or a trailing edge of the lateral reference wall 37 from the lateral wall 43). Further, urging to bring the lateral reference wall 37 into contact with the lateral wall 43 via the polarization separation element 7 prevents tilt of the polarization separation element 7 and the quartz waveplate unit 8 in the horizontal direction (separation of an upper portion or a lower portion of the lateral reference wall 37 from the lateral wall 43).

Thus, a positional relationship between the holding metal plate 33 and the polarization separation element 7 can be determined with high accuracy and the quartz waveplate unit 8 can align polarization of the output light from the polarization separation element 7. Further, a positional relationship between the quartz waveplate unit 8 or the polarization separation element 7 and the unit base 25 is determined with high accuracy, and the quartz waveplate unit 8 and the polarization separation element 7 are optically positioned with high accuracy.

As the first urging portion 51 urges the polarization separation element 7 downward and the second urging portion 53 urges the polarization separation element 7 downward, the lower end surface of the polarization separation element 7 is brought into contact with the support portions 45 and 46. Urging to bring the lower end surface of the polarization separation element 7 into contact with the support portions 45 and 46 prevents tilt with respect to the light beam from the light source 2 (forward tilt by which a trailing edge portion of the lower end surface is separated from the support portions 45 and 46 or backward tilt by which a leading edge portion of the lower end surface is separated from the support portions 45 and 46). Further, urging to bring the lower end surface of the polarization separation element 7 into contact with the support portions 45 and 46 prevents rotation about the light beam from the light source 2 (the lower end surface is separated from one of the two support portions 45 and 46).

Further, while the first urging portion 51 urging the polarization separation element 7 obliquely downward has been illustrated, the side surface facing the lateral wall 41 of the polarization separation element 7 may be urged in the horizontal direction. Further, the first urging portion 51 and the second urging portion 53 are not limited to the plate springs, but may be other springs such as coil springs or elastic bodies such as urethane or rubber.

Figure 10:
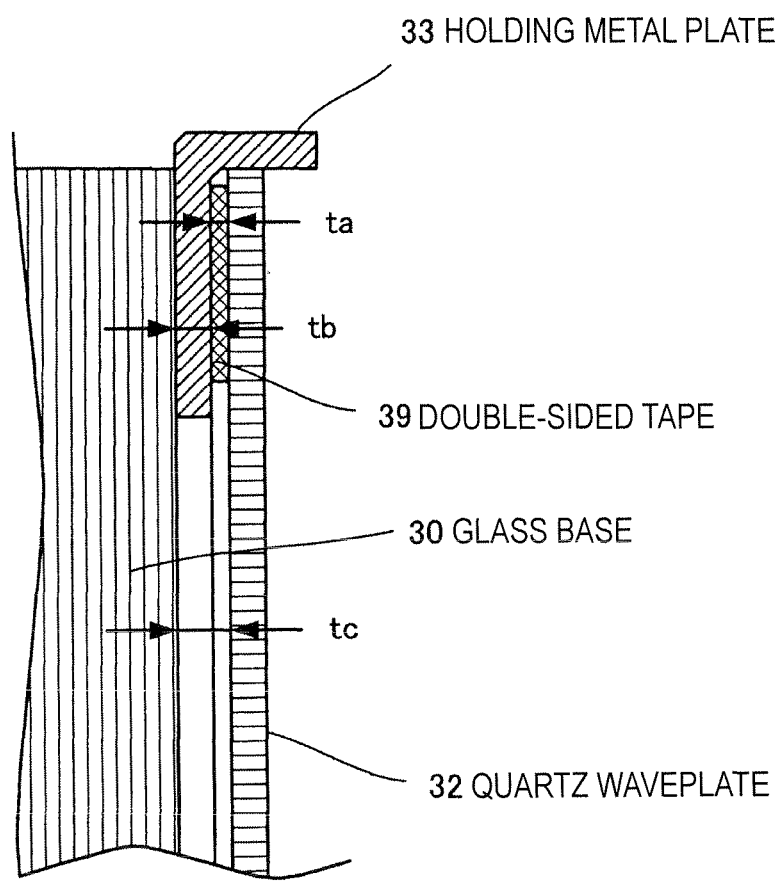
FIG. 10 is a partial cross-sectional view taken along a line B-B of the polarization separation element and the quartz waveplate unit showing a state in which the polarization separation element and the quartz waveplate unit of the first embodiment are held.

Next, a configuration suitable for cooling the polarization separation element 7 and the quartz waveplate unit 8 of the first embodiment will be described with reference to FIG. 10. FIG. 10 is a partial cross-sectional view taken along a line B-B of the polarization separation element and the quartz waveplate unit showing a state in which the polarization separation element and the quartz waveplate unit of the first embodiment are held.

The polarization separation element 7 and the quartz waveplate unit 8 contact the glass base 30 and the holding metal plate 33, and the glass base 30 and the quartz waveplate 32 are arranged in the unit base 25 with a gap having a width tc. The holding metal plate 33 holds the quartz waveplate 32 to a surface opposite to a surface facing the glass base 30 to thereby provide a large gap between the glass base 30 and the quartz waveplate 32. Even when such a gap is provided, optical performance is not damaged since the polarization separation element 7 and the quartz waveplate unit 8 are positioned with high accuracy.

A gap of the width tc is a sum of a plate thickness tb of the holding metal plate 33 and a thickness ta of the double-sided tape 39. The thickness ta of the double-sided tape 39 is not sufficient as a gap for ventilation. However, the gap having the width tc obtained by adding the plate thickness tb of the holding metal plate 33 to the thickness ta of the double-sided tape 39 has such a size that cooling air can flow between the glass base 30 and the quartz waveplate 32.

For example, the plate thickness tb of the holding metal plate 33 may be about 0.25 mm, or may be 0.3 mm, 0.5 mm, or more according to necessary cooling performance. The great plate thickness tb of the holding metal plate 33 increases a heat capacity of the holding metal plate, thus suppressing a temperature rise in the quartz waveplate 32.

Thus, the optical apparatus 100 achieves both a heat solution and positioning accuracy for the polarization separation element 7 and the quartz waveplate unit 8. The heat solution for the polarization separation element 7 and the quartz waveplate unit 8 prevents peeling, damage, or deterioration of the quartz waveplate 32 and contributes to long life of the optical apparatus 100 or improvement of long-term maintenance.

(Second Embodiment)

Figure 11:
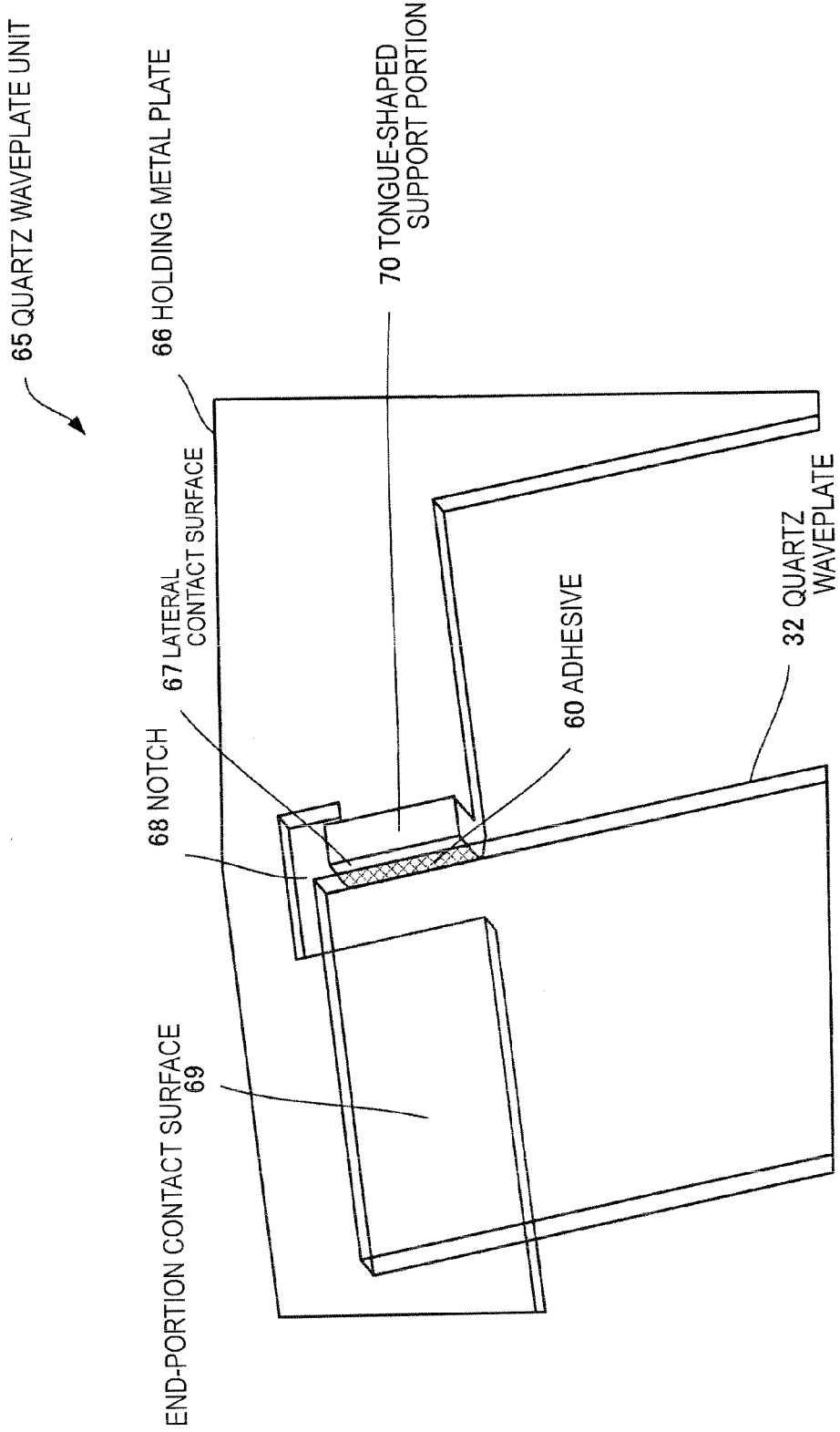
FIG. 11 is a partial perspective view of a quartz waveplate unit of a second embodiment.

Next, a quartz waveplate unit of a second embodiment will be described with reference to FIG. 11. FIG. 11 is a partial perspective view of the quartz waveplate unit of the second embodiment.

In the quartz waveplate unit 65, a quartz waveplate 32 is held using an adhesive (e.g., a UV adhesive) 60 instead of the double-sided tape 39. A holding metal plate 66 includes multiple pairs of end-portion contact surfaces 69 contacting an end portion of the quartz waveplate 32 on two opposite frame-shaped sides that form a holding metal plate opening window 38, and tongue-shaped support portions 70 corresponding to both end portions of each quartz waveplate 32. The holding metal plate 66 is arranged to include the tongue-shaped support portion 70 formed on an upper end and the tongue-shaped support portion 70 formed on a lower end in a pair to support one side of the quartz waveplate 32. The tongue-shaped support portion 70 is arranged toward a center side of the holding metal plate 66 in a horizontal direction. That is, the tongue-shaped support portion 70 is symmetrically arranged at a center in a horizontal direction of the holding metal plate 66.

A tip of the tongue-shaped support portion 70 is bent in a position facing a notch 68. The tongue-shaped support portion 70 includes a lateral contact surface 67 that contacts the quartz waveplate 32 on a side surface of the standing tip. The lateral contact surface 67 and the quartz waveplate 32 are adhered by the adhesive 60.

Thus, the lateral contact surface 67 and the quartz waveplate 32 are adhered by the adhesive 60, but the tongue-shaped support portion 70 can relieve a stress caused by a difference in linear expansion and applied to the quartz waveplate 32, through the notch 68. Further, since the quartz waveplate unit 65 allows a mounting position of the quartz waveplate 32 to be determined through the contact with the lateral contact surface 67, attachment workability of the quartz waveplate 32 to the holding metal plate 66 is improved.

Further, while the heat dissipation through the upper folded portion 36 of the holding metal plate 33 has been illustrated, a plurality of fins may be further provided in the upper folded portion 36 for further cooling of the holding metal plate 33. Further, positions in which the fins are provided in the holding metal plate 33 are not limited to the upper folded portion 36, and the fins may be provided in other positions, such as a region facing the vent 44 of the quartz waveplate lower-end support portion 35. Further, the holding metal plate 33 may be a plate-shaped member made of a metal (e.g., stainless). Further, the holding metal plate 33 may be formed of a high thermal conductivity material (e.g., aluminum) to conduct heat from the quartz waveplate 32. Further, the holding metal plate 33 may have a heat sink structure to secure a heat capacity sufficient to suppress a temperature rise in the quartz waveplate 32.

Further, while the quartz waveplate 32 usable under a high-temperature environment has been illustrated as the waveplate for converting one polarization component of the first polarization component and the second polarization component into the other polarization component, the waveplate may be formed of other materials.

Additionally, the present technology may also be configured as below.

(1) An optical apparatus including:

a polarization separation element for separating an incident light beam into a first polarization component and a second polarization component and outputting the first polarization component and the second polarization component;

a polarization conversion unit including a waveplate for converting one of the first polarization component and the second polarization component into the other polarization component, the waveplate being held to a holding metal plate; and a housing for holding the polarization separation element and the polarization conversion unit.

(2) The optical apparatus according to (1), wherein the housing includes a housing portion for housing the polarization separation element and the polarization conversion unit, wherein the holding metal plate includes a lateral wall located between one side surface of the polarization separation element and the housing portion in a state in which the polarization separation element and the polarization conversion unit have been housed in the housing portion, and wherein the optical apparatus includes a lateral urging portion for urging the other side surface of the polarization separation element toward the one side surface.

(3) The optical apparatus according to (2), including:

an open-end urging portion for urging an end surface of the polarization separation element facing an open side of the housing portion in a housing direction.

(4) The optical apparatus according to any of (1) to (3), wherein the holding metal plate holds the waveplate to a surface opposite to a surface facing the polarization separation element.

(5) The optical apparatus according to (4), wherein the housing includes a vent for ventilation formed in a gap between the polarization separation element and the waveplate.

(6) The optical apparatus according to any of (1) to (5), wherein the holding metal plate includes a heat dissipation portion for performing heat dissipation from the holding metal plate.

(7) The optical apparatus according to any of (1) to (6), wherein the holding metal plate includes a window frame portion that forms an opening window on which light output from the polarization separation element is incident, and wherein the polarization conversion unit sticks both end portions of the waveplate having a strip-shape facing the opening window to the window frame portion to hold the waveplate to the holding metal plate.

(8) The optical apparatus according to any of (1) to (6), wherein the holding metal plate includes a window frame portion that forms an opening window on which light output from the polarization separation element is incident, and wherein the window frame portion includes a support portion facing a notch portion formed by cutting the window frame out, the waveplate being adhered to and supported by the support portion.

(9) A projection apparatus including:
a light source;
an optical apparatus for converting a polarization component of an incident light beam from the light source;
a separation optical component for separating an output light from the light source according to wavelength bands;
a plurality of optical modulation elements for optically modulating the incident light separated according to the wavelength bands;
a synthesis optical component for synthesizing output lights from the plurality of optical modulation elements and outputting the resulting output light; and
a projection unit for projecting and outputting the output light from the synthesis optical component,
wherein the optical apparatus includes
a polarization separation element for separating the incident light beam into a first polarization component and a second polarization component and outputting the first polarization component and the second polarization component,
a polarization conversion unit including a waveplate for converting one of the first polarization component and the second polarization component into the other polarization component, the waveplate being held to a holding metal plate, and
a housing for holding the polarization separation element and the polarization conversion unit.

Further, several changes may be made to the above-described embodiments without departing from the gist of the embodiments.

It should be understood by those skilled in the art that various modifications, combinations, sub-combinations and alterations may occur depending on design requirements and other factors insofar as they are within the scope of the appended claims or the equivalents thereof.

The present disclosure contains subject matter related to that disclosed in Japanese Priority Patent Application JP 2011-207014 filed in the Japan Patent Office on Sep. 22, 2011, the entire content of which is hereby incorporated by reference.

What is claimed is:

1. An optical apparatus comprising:
a polarization separation element for separating an incident light beam into a first polarization component and a second polarization component and outputting the first polarization component and the second polarization component;
a polarization conversion unit including a waveplate for converting one of the first polarization component and the second polarization component into the other polarization component, the waveplate being held to a holding metal plate; and
a housing for holding the polarization separation element and the polarization conversion unit,
wherein the holding metal plate includes a window frame portion that forms an opening window on which light output from the polarization separation element is incident, and
wherein the window frame portion includes a support portion facing a notch portion formed by cutting the window frame out, the waveplate being adhered to and supported by the support portion.

2. The optical apparatus according to claim 1,
wherein the housing includes a housing portion for housing the polarization separation element and the polarization conversion unit,
wherein the holding metal plate includes a lateral wall located between one side surface of the polarization separation element and the housing portion in a state in which the polarization separation element and the polarization conversion unit have been housed in the housing portion, and
wherein the optical apparatus includes a lateral urging portion for urging the other side surface of the polarization separation element toward the one side surface.

3. The optical apparatus according to claim 2, comprising:
an open-end urging portion for urging an end surface of the polarization separation element facing an open side of the housing portion in a housing direction.

4. The optical apparatus according to claim 1,
wherein the holding metal plate holds the waveplate to a surface opposite to a surface facing the polarization separation element.

5. The optical apparatus according to claim 4,
wherein the housing includes a vent for ventilation formed in a gap between the polarization separation element and the waveplate.

6. The optical apparatus according to claim 1,
wherein the holding metal plate includes a heat dissipation portion for performing heat dissipation from the holding metal plate.

7. The optical apparatus according to claim 1,
wherein the holding metal plate includes a window frame portion that forms an opening window on which light output from the polarization separation element is incident, and
wherein the polarization conversion unit sticks both end portions of the waveplate having a strip-shape facing the opening window to the window frame portion to hold the waveplate to the holding metal plate.

8. A projection apparatus comprising:
a light source;
an optical apparatus for converting a polarization component of an incident light beam from the light source;
a separation optical component for separating an output light from the light source according to wavelength bands;
a plurality of optical modulation elements for optically modulating the incident light separated according to the wavelength bands;
a synthesis optical component for synthesizing output lights from the plurality of optical modulation elements and outputting the resulting output light; and
a projection unit for projecting and outputting the output light from the synthesis optical component,
wherein the optical apparatus includes
a polarization separation element for separating the incident light beam into a first polarization component and a second polarization component and outputting the first polarization component and the second polarization component,
a polarization conversion unit including a waveplate for converting one of the first polarization component and the second polarization component into the other polarization component, the waveplate being held to a holding metal plate, and
a housing for holding the polarization separation element and the polarization conversion unit,
wherein the holding metal plate includes a window frame portion that forms an opening window on which light output from the polarization separation element is incident, and
wherein the window frame portion includes a support portion facing a notch portion formed by cutting the window frame out, the waveplate being adhered to and supported by the support portion.

9. An optical apparatus comprising:
a polarization separation element for separating an incident light beam into a first polarization component and a second polarization component and outputting the first polarization component and a second polarization component;
a polarization conversion unit including a waveplate for converting one of the first polarization component and the second polarization component into the other polarization component, the waveplate being held to a holding metal plate, wherein an incident surface of the metal holding plate surface contacts an output surface of the polarization separation element; and
a housing for holding the polarization separation element and the polarization conversion unit,
wherein the holding metal plate includes a window frame portion that forms an opening window on which light output from the polarization separation element is incident, and
wherein the window frame portion includes a support portion facing a notch portion formed by cutting the window frame out, the waveplate being adhered to and supported by the support portion.

10. The optical apparatus according to claim 9,
wherein the housing includes a housing portion for housing the polarization separation element and the polarization conversion unit,
wherein the holding metal plate includes a lateral wall located between one side surface of the polarization separation element and the housing portion in a state in which the polarization separation element and the polarization conversion unit have been housed in the housing portion, and
wherein the optical apparatus includes a lateral urging portion for urging the other side surface of the polarization separation element toward the one side surface.

11. The optical apparatus according to claim 10, comprising:
an open-end urging portion for urging an end surface of the polarization separation element facing an open side of the housing portion in a housing direction.

12. The optical apparatus according to claim 9,
wherein the holding metal plate holds the waveplate to a surface opposite to a surface facing the polarization separation element.

13. The optical apparatus according to claim 12,
wherein the housing includes a vent for ventilation formed in a gap between the polarization separation element and the waveplate.

14. The optical apparatus according to claim 9,
wherein the holding metal plate includes a heat dissipation portion for performing heat dissipation from the holding metal plate.

15. The optical apparatus according to claim 9,
wherein the holding metal plate includes a window frame portion that forms an opening window on which light output from the polarization separation element is incident, and
wherein the polarization conversion unit sticks both end portions of the waveplate having a strip-shape facing the opening window to the window frame portion to hold the waveplate to the holding metal plate.

16. The optical apparatus according to claim 9,
wherein the holding metal plate includes a window frame portion that forms an opening window on which light output from the polarization separation element is incident, and
wherein the window frame portion includes a support portion facing a notch portion formed by cutting the window frame out, the waveplate being adhered to and supported by the support portion.

17. A projection apparatus comprising:
a light source;
an optical apparatus for converting a polarization component of an incident light beam from the light source;
a separation optical component for separating an output light from the light source according to wavelength bands;
a plurality of optical modulation elements for optically modulating the incident light separated according to the wavelength bands;
a synthesis optical component for synthesizing output lights from the plurality of optical modulation elements and outputting the resulting output light; and
a projection unit for projecting and outputting the output light from the synthesis optical component,
wherein the optical apparatus includes
a polarization separation element for separating the incident light beam into a first polarization component and a second polarization component and outputting the first polarization component and the second polarization component,
a polarization conversion unit including a waveplate for converting one of the first polarization component and the second polarization component into the other polarization component, the waveplate being held to a holding mental plate, wherein an incident surface of the metal holding plate surface contacts an output surface of the polarization separation element; and
a housing for holding the polarization separation element and the polarization conversion unit,
wherein the holding metal plate includes a window frame portion that forms an opening window on which light output from the polarization separation element is incident, and
wherein the window frame portion includes a support portion facing a notch portion formed by cutting the window frame out, the waveplate being adhered to and supported by the support portion.

* * * * *